United States Patent [19]

Pultinas, Jr.

[11] Patent Number: 4,591,508
[45] Date of Patent: May 27, 1986

[54] COFFEE PRODUCT AND PROCESS

[75] Inventor: Edmund P. Pultinas, Jr., Cincinnati, Ohio

[73] Assignee: The Procter & Gamble Co., Cincinnati, Ohio

[21] Appl. No.: 366,902

[22] Filed: Apr. 9, 1982

Related U.S. Application Data

[63] Continuation-in-part of Ser. No. 348,523, Feb. 12, 1982, abandoned, which is a continuation-in-part of Ser. No. 320,163, Nov. 10, 1981, abandoned, which is a continuation-in-part of Ser. No. 284,856, Jul. 20, 1981, abandoned.

[51] Int. Cl.$^4$ ............................................. A23F 5/10
[52] U.S. Cl. ................................. 426/595; 426/466; 426/467; 426/468; 426/469
[58] Field of Search ...................... 426/595, 466–469

[56] References Cited

U.S. PATENT DOCUMENTS 3,088,825 5/1963 Topalian et al. ..................... 426/467
3,122,439 2/1964 MacAllister et al. ................ 426/467
3,615,667 10/1971 Joffe .................................... 426/388
3,660,106 5/1972 McSwiggin et al. ............ 426/595 X
4,169,164 9/1979 Hubbard et al. ..................... 426/467
4,267,200 5/1981 Klien et al. .......................... 426/595
4,322,447 3/1982 Hubbard .............................. 426/467

OTHER PUBLICATIONS

*Coffee Processing Technology*, by Sivetz & Foote, The Avi Publishing Co., Inc., (1963), vol. 1, pp. 248, 332–335.

Primary Examiner—Joseph Golian
Attorney, Agent, or Firm—Richard C. Witte; Julius P. Filcik; Rose Ann Dabek

[57] ABSTRACT

An improved, lightly milled roast and ground coffee having high extractability, superior brew clarity, and an aroma intensity of from about 30,000 to about 55,000 G.C. counts and a method for making the same are disclosed. Roast coffee beans are cooled to below about 65° F., maintained below about 65° F. as they enter the grinder, coarsely ground, and lightly milled to produce particles of coffee ranging in thickness from about 30 to about 40 mils. The coffee product has the appearance of a coarse granule with a fine powder adhering to it.

12 Claims, 1 Drawing Figure

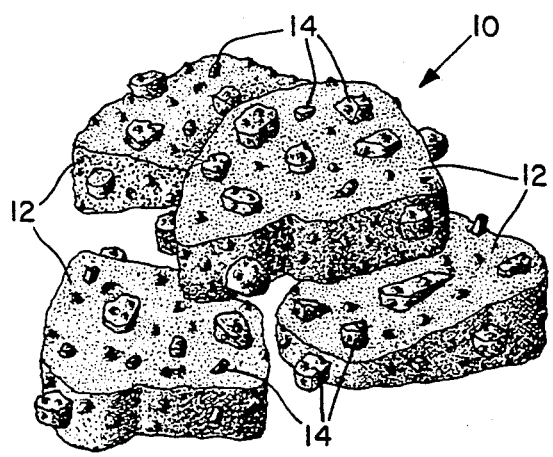

COFFEE PRODUCT AND PROCESS

RELATED APPLICATIONS

This is a continuation-in-part of prior, co-pending U.S. patent application, Ser. No. 348,523, filed Feb. 12, 1982, now abandoned, which is a continuation-in-part of U.S. application, Ser. No. 320,163, filed Nov. 10, 1981 now abandoned, which is a continuation-in-part of U.S. application Ser. No. 284,856, filed July 20, 1981, now abandoned.

TECHNICAL FIELD

The present invention relates to a novel roast and ground thick-particled vacuum coffee with extractability of the water-soluble flavor constituents equivalent to or better than conventionally ground coffee, enhanced container aroma, and brew clarity and to a method for making the same.

BACKGROUND

Numerous attempts have been made in the past to provide a roast coffee product which has both an intense, persistent aroma and high extractability of the flavorful water-soluble constituents often referred to as brew solids.

It long has been known that the extractability of roast coffee (the amount of brew solids which can be extracted from a given weight of coffee from which a coffee brew is made) could be increased by grinding the coffee to finer particle sizes. However, roast coffee products ground to very fine grinds have bed-permeability characteristics which can inhibit the extraction of the water-soluble constituents due to bed compaction, pooling, channeling, etc. To avoid such brewing problems, it has been conventional to provide roast coffee ground to mixtures of variously sized particles, such as the traditional grinds of "regular", "drip" and "fine".

It also is known in the art that coffee's extractability can be enhanced in comparison to conventional coffee products by flaking roast and ground coffee. Roast and ground coffee is transformed into flaked coffee by roll milling the roast and ground coffee (see, for example, U.S. Pat. No. 1,093,362, issued Apr. 14, 1933 to R. B. McKinnis, and U.S. Pat. No. 2,368,113, issued Jan. 30, 1945 to C. W. Carter). An improved flaked roast and ground coffee of enhanced extractability of the water-soluble constituents is disclosed by F. M. Joffe in U.S. Pat. No. 3,615,677, issued Oct. 26, 1971, as well as a method for its production in U.S. Pat. No. 3,660,106, issued May 2, 1972 to J. R. McSwiggin et al.

The roll milling process and final product taught in the above-cited patents, however, do have certain limitations. One such limitation concerns flake thickness. The Joffe '667 patent teaches that thick flakes (i.e. 26–30 mils) are undesirable because of their high flake density and that flakes of intermediate thickness (8–25 mils) are preferred (Col. 8, lines 49–54). Indeed, Joffe teaches that to produce a roll milled coffee product having consumer acceptable tamped bulk density of 0.38 to 0.50 g./cc., and preferably of 0.42 to 0.48 g./cc., it is "essential" that the flakes have a thickness of 8 to 25 mils and preferably of 10 to 16 mils (Col. 8, lines 55–60). Flakes within this thickness range are disclosed as being less susceptible than other flakes to variable bulk density.

The roll milling process also can affect detrimentally certain roast and ground coffee attributes. The principal disadvantage is that flaking reduces the container aroma level of packaged coffee and affects the quality of the aroma. To minimize the aroma penalty exacted by flaking, several modifications in the roasting and processing of the coffee beans have been developed. For example, mixtures of conventional roast and ground coffee and of flaked coffee have been formulated (see, for example, U.S. Pat. No. 3,615,667 issued Oct. 26, 1971 to F. M. Joffe). However, such mixtures merely trade off increased container aroma intensity for increased extractability when conventional roast and ground coffee which has a higher aroma level is substituted for flaked coffee which has higher extractability.

The container aroma level of flaked coffee could be increased by the simple addition of a highly aromatized carrier oil such as is disclosed in U.S. Pat. No. 3,769,032, issued Oct. 30, 1973 to Lubsen et al. Such an addition, however, would undesirably increase the oil level of the coffee itself as well as any coffee brew made therefrom. Moreover, the aroma material from relatively large quantities of donor coffee must be collected in order to aromatize small quantities of flaked coffee.

Both the aroma retention and the extractability of roast and ground coffee are said to be enhanced by the fast roasting of coffee beans. U.S. Pat. No. 3,088,825 by H. H. Topalian and U. D. Luddington (1963) and U.S. Pat. No. 3,122,439 by R. V. MacAllister and C. H. Spotholtz (1964) disclose processes for the fast roasting of coffee beans. The MacAllister patent also discloses that such fast roasted beans can be flaked.

The container aroma concentration also can be enhanced by cold processing roast and ground coffee to produce a flaked coffee product. U.S. Pat. No. 4,267,200, Klien & Gieseker (1981) discloses that cold processing can provide an increase in the container aroma level of a thin-flaked coffee. After the coffee has been roasted and quenched in conventional manner it is cooled to $-5°$ to $5°$ F. ($-21°$ to $-15°$ C.) and then ground. After grinding, the coffee particles are within the temperature range of $20°$ F. to $40°$ F. ($-7°$ to $+4.5°$ C.), and the temperature is held below $40°$ F. ($4.5°$ C.) throughout the rest of the processing.

There are disadvantages to cold processing, however. One is that it is an expensive procedure and requires special refrigeration equipment. Another is that some flaked coffee which has been cold processed shows a significant decrease in bed permeability. Such decreases lead to unacceptably long drain times necessary to prepare coffee brews.

Thus, those skilled in the art of coffee processing frequently have been faced with the problem that enhancing or optimizing one attribute can be achieved only at the expense of another. If roast coffee beans are finely ground, the extractability of brew solids is improved, but the resulting coffee product has bed permeability problems and reduced brew clarity. Coarsely ground coffee, on the other hand, produces a coffee with excellent brew clarity and aroma, but which suffers from poor extractability. Milling roast and ground coffee will improve the extractability of the brew solids from the beans, but decreases the container aroma, unless additional steps are taken, steps which can be costly and produce problems of their own.

Given the state of the coffee processing art as described above, there is a continuing need for new and useful roast coffee products which provide high extractability of the flavorful coffee brew solids and which possess high container aroma levels. Accordingly, it is an object of the present invention to provide a milled roast and ground coffee product of increased extractability and enhanced container aroma.

It is a further object of this invention to provide a method of enhancing the container aroma impact of milled coffee which is not as expensive as cold processing.

It is a further object of this invention to produce a milled coffee which gives superior brew clarity when compared to "regular" "drip" or "fine" grind coffees.

It surprisingly has been discovered that the above objects can be realized and superior coffee products provided which exhibit extractability equivalent to drip grind, superior container aroma, and flake density and bed permeability comparable to conventional roast and ground and flaked coffees by coarsely grinding and lightly milling roast coffee beans under cool, as opposed to cold, temperatures to form thick particles of coffee of about 30 to about 40 mils with a coarse particle size distribution and a density of about 0.40 to 0.46 g./cc. Although conventionally processed roast and ground coffee with a similar particle size distribution would have poor extractability compared to standard vacuum coffees, the unique coffee product made by a combination of coarse grinding and light milling has extractability equivalent to or better than other roast and ground coffee products. In addition, in contrast to the teachings of the prior art, it has been discovered that container aroma can be heightened by grinding and processing roasted coffee beans which have been cooled and maintained at a temperature below about 65° F. (18° C.), preferably between 55° and 65° F. (13° and 18° C.). Surprisingly, decreasing the temperature to below 40° F. (4.5° C.), as disclosed in U.S. Pat. No. 4,267,200, does not significantly enhance the aroma further.

SUMMARY OF THE INVENTION

This invention relates to highly aromatic thick particles of coffee, wherein said particles have high exractability, a container aroma intensity ranging from about 30,000 to about 55,000 G.C. counts, a bulk density ranging from about 0.40 to about 0.46 g./cc., a moisture content of about 3% to about 6%, particle thickness of from about 30 to about 40 mils and a coarse particle size distribution.

The present invention also provides a process by which the above-described roast coffee product can be prepared. In the present process, green coffee beans are roasted, preferably within 1 to 5 minutes, cooled to below about 65° F. (18° C.), held at a temperature below about 65° F. (18° C.) as they enter the grinder and then coarsely ground. The ground beans are maintained at a temperature below about 80° F. (27° C.) as they are fed into a roll mill and milled within a range of carefully defined coffee feed rates, roll mill pressures, and roll peripheral surface speeds.

The resulting novel coffee product has intense and persistent container aroma due to the thick, coarse particles and cool processing, superior extractability in comparison to conventionally processed coffees having a similar particle size distribution, excellent flavor, and superior brew clarity in comparison to more finely ground and milled coffees.

BRIEF DESCRIPTION OF THE DRAWING

The drawing is a pictorial representation of several coarsely ground and lightly milled particles 10, the fine crystals on the surface 12, and fine particles 14 adhering to the surface.

DETAILED DESCRIPTION OF THE INVENTION

It surprisingly has been discovered that a coffee product can be made which is characterized by improved brew clarity and extractability equal to or better than conventionally ground coffee, as well as more persistent container aroma and good bed permeability. These results are achieved through a unique combination of processing conditions, including cool temperatures, coarse grinding, and light milling.

COARSELY GROUND, THICK PARTICLES OF COFFEE

The coffee product herein is characterized by thick particles having fine particles and crystal-like materials adhering to the surface. In making this coffee having a coarse particle size distribution and having enhanced container aroma, good extractability, superior brew clarity, and acceptable bed permeability, it is necessary to control the particle thickness, particle moisture content, particle size distribution, bulk density, and aroma intensity. Each of these coffee product properties, as well as product preparation and use, are described in detail in the following sections.

A. Bulk Density

The coarsely ground and lightly milled coffee product of the present invention should have a bulk density of about 0.40 to about 0.46 g./cc. Bulk density refers to the overall density of a plurality of particles measured after vibratory settlement in a manner such as is described on pages 130–31 of Sivetz, *Coffee Processing Technology*, Avi Publishing Company, Westport, Conn. 1963, Vol II.

It is necessary that the coffee product of this invention have a bulk density within the range of 0.38 to 0.50 g./cc. to assure its acceptability to consumers. This is because bulk densities within this range are generally the bulk densities of conventionally prepared roast and ground coffees at "regular", "drip" and "fine" grind. If the bulk density varies from this range and is higher, for example, the consumer would need to use a substantially less than usual quantity of coffee to produce a brew of given strength; this required adjustment in consumer habits might be made with some difficulty.

B. Particle Thickness

The improved coffee product described herein is comprised of lightly milled particles; those retained on a No. 16 mesh U.S. Standard Sieve ("on 16") range in thickness from about 30 to about 40 mils. A preferred product has an average (on 16) particle thickness within the range of 32 to 36 mils. Surprisingly, in light of the teachings of the prior art (see, for example, U.S. Pat. No. 3,615,667, Col. 8, issued to Joffe) it has been discovered that coffee milled to form particles within this thickness range do not have a bulk density too low or too variable to be consumer acceptable. Joffe teaches that to produce a roast and ground coffee product which has a consumer acceptable and nonvariable bulk density it is essential that the ground coffee be milled to a flake thickness of 8 to 25 mils, preferably of 10 to 16 mils.

C. Moisture Content

The novel coffee product disclosed herein has an average moisture content of about 3% to about 8% by weight of the coffee product. Preferred coffee products have an average moisture content of about 3% to about 6% by weight. Moisture contents lower than 2.5% are to be avoided because the resulting particles are more brittle and produce more fines during process handling and packing. Moisture contents above 8.0% are less desirable because of their greater tendency to stale.

Typically, moisture content of milled coffee is adjusted by varying the moisture level of the roast and ground coffee feed from which the particles are produced. The adjustments to the feed moisture level can be controlled, for example, by controlling the amount of water used to quench and to thereby halt the exothermic roasting operation. The moisture content of the roasted beans is not appreciably affected by grinding or even by the milling operations unless high roll surface temperatures are used.

D. Particle Size Distribution

As noted above, the novel coffee product of this invention has a particle thickness within a select particle thickness range. It also is important to control the dimension which characterizes the particle size of the coffee.

It is conventional in the coffee art to describe coffee particle size distribution, including milled coffee, in terms of sieve fractions, i.e. that weight percentage which remains on a particular sieve or that weight percentage which passes through a particular sieve. For example, a hypothetical coffee product might have a sieve analysis such that 40% by weight remains on a U.S. Standard No. 14 sieve with 60% by weight passing through a No. 14 sieve. Since the sieve opening for a No. 14 sieve is approximately 55 mils, such a coffee product would comprise about 40% by weight of particles which have a particle width greater than 55 mils, while the remaining weight fraction would comprise particles which have a particle size less than the 55 mil size opening.

Many coffee manufacturers have their standards based on using "Tyler" standard screen scale testing sieves. The only difference between U.S. Standard sieves and the Tyler screen scale sieves is the identification method. Tyler screen scale sieves are identified by the nominal meshes per linear inch while the U.S. Standard sieves are identified by millimeters or microns or by an arbitrary number which does not necessarily mean mesh count.

Depending upon the specific particle size distribution desired in a final coffee product, coffee beans can be ground to various sizes. Particle size distributions or grind sizes traditionally are referred to as "regular", "drip" and "fine". The standards of these grinds, as suggested in the 1948 "Coffee Grinds: Simplified Practice Recommendation R231-48", published by the Coffee Brewing Institute, Inc., New York, is incorporated herein by reference in its entirety.

It has been found, however, that larger "coarse" grind size particles are necessary to achieve the benefits attributed to the novel product of this invention. The combination of light milling and coarse grinding produces a unique product composed of thick particles with a coarse particle size distribution which has enhanced container aroma. In addition, the coffee when brewed produces a beverage with superior brew clarity because of the small number of fines present.

The product of this invention has a particle size distribution such that:

(a) from about 15 to about 48% by weight are retained on a No. 12 U.S. Standard Sieve, (b) from about 20 to about 42% by weight are retained on a No. 16 U.S. Standard Sieve, (c) from about 10 to about 25% by weight are retained on a No. 20 U.S. Standard Sieve, (d) from about 2 to about 15% by weight are retained on a No. 30 U.S. Standard Sieve, and (e) from about 5 to about 20% by weight pass through a No. 30 U.S. Standard Sieve.

E. Cell Structure

The cell structure of the product of this invention is essentially like that of conventionally processed roast and ground coffee. Unlike flaked coffee, which undergoes a significant amount of cell rupture during the milling process, almost all the cells of the particles of the instant invention remain intact.

F. Container Aroma Concentration

The present coffee product has an initial aroma concentration as measured by the method described below of about 30,000 to about 55,000 gas chromatograph total counts. Preferred coffee products of the present invention have at least about 40,000 gas chromatograph total counts. Preferred decaffeinated coffee products of this invention have at least about 30,000 gas chromatograph total counts.

As used herein, "aroma" refers to those aromatic volatile materials which are present in the headspace or void space in contained or packaged coffee. Thus, "aroma" as used herein is to be distinguished from the coffee aroma resulting from brewing, and from the coffee aroma detectable above a freshly prepared coffee brew. The term "container aroma" is intended to refer to the aroma level of the present milled coffee products at equilibrium in a sealed container prior to opening. It is, of course, realized that any coffee product if allowed to remain exposed to open air will eventually lose its aroma due to the volatile and fugitive nature of coffee aroma materials.

High container aroma concentrations of coffee aroma, of course, provide the desirable "fresh coffee" aroma impression to the coffee user upon opening the coffee container. Further, the high container aroma concentrations of the present invention have some beneficial effect upon the organoleptic properties of coffee brews made from the present coffee products.

The high container aroma concentrations of the present development are achieved by minimizing the aroma losses of the roast coffee in the grinding and milling steps of the present process of preparation. While not wishing to be bound by any theory, aroma loss apparently is made more difficult by the reduced surface area and longer diffusional paths associated with thick particles and a coarse particle size distribution.

G. Extractability

Conventionally processed coffees with a similar coarse particle size distribution and thick particles have very poor extractability of the water soluble flavor constituents. Surprisingly, the novel product of this invention extracts equally to finely ground roast and ground coffees such as "drip grind". The dramatic increase in extraction in comparison to a ground coffee with a coarse particle size distribution is due to the milling operation the ground coffee undergoes.

A surprising aspect of this development is that when the coffee is brewed in a percolator the extractability is especially good and significantly better in comparison to that of conventionally processed coffees. The greater extractability provided by the novel coffee of this invention enables more cups of equal brew strength and flavor to be brewed from a given amount of coffee. The normal method of measuring the strength of a coffee brew is to measure the percent soluble solids, commonly referred to as brew solids. This measurement can be made by oven-drying the brewed coffee and weighing the remainder. The percent soluble solids also can be ascertained optically by measuring the index of refraction of the coffee brew. The index of refraction is correlated to brew solids as measured by the oven-drying technique.

PREPARATION OF THE COARSELY GROUND, LIGHT MILLED COFFEE

In the preparation of this novel coffee it is essential to control the roast time and the processing temperatures, to coarsely grind the roasted beans, and to control several variables during the roll milling operation. Each of these variables will be discussed in detail below.

A. Starting Material Selection

The aromatic milled roast and ground coffee of the present invention can be made from a variety of roast and ground coffee blends, including those which may be classified for convenience and simplification as low-grade, intermediate-grade, and high-grade coffees. Suitable examples of low-grade coffees include the natural Robustas such as the Ivory Coast Robustas and Angola Robustas, and the Natural Arabicas such as the natural Perus and natural Ecuadors. Suitable intermediate-grade coffees include the natural Arabicas from Brazil such as Santos, Paranas and Minas, and natural Arabicas such as Ethiopians. Examples of high-grade coffees include the washed Arabicas such as Mexicans, Costa Ricans, Colombians, Kenyas and New Guineas. Other examples and blends thereof are known in the art and illustrated in, for example, U.S. Pat. No. 3,615,667 (issued Oct. 26, 1971 to Joffe), incorporated herein by reference.

Decaffeinated roast and ground coffee also can be used herein to make a decaffeinated coffee product. As is known in the art, the removal of caffeine from coffee products frequently is accomplished at the expense of the removal of certain other desirable components which contribute to flavor. The tendency of decaffeinated products to be either weak or deficient in flavor thus has been reported in the literature. The process of this invention provides a decaffeinated coffee with enhanced container aroma and extractability equivalent to conventional ground decaffeinated coffee.

B. Roasting

Green coffee beans are roasted to a Hunter "L" color of from about 18 to about 23. It is preferable that the beans are subjected to a fast roasting process whereby they are roasted for approximately 1 to approximately 5 minutes, more preferably for about 2 to about 3.5 minutes. If beans are roasted for less than 1 minute, the roast is not uniform and insufficient flavor development occurs. Fast roasting is preferred because higher aroma levels and extractable solids are generated.

After the coffee beans have been roasted they are cooled to a temperature below about 65° F. (18° C.) by conventional water quenching, followed by additional cooling using refrigerated air to achieve the desired temperature. The water quench is described, for example, in Sivetz & Foote, id., Vol. I, p. 208.

Other cooling methods such as liquid nitrogen, carbon dioxide, cool air, etc., can also be used.

C. Grinding

The cooled roasted beans must be held at a temperature below 65° (18° C.) upon entering the grinder. The grinding process generates heat and thus warms the beans.

As has been noted above, although coffee typically is ground to "regular", "drip" and "fine" sizes, it has been discovered that the larger "coarse" grind size particles must be used in the novel method of making the coffee product described herein. The term "coarse" grind is used liberally in the coffee art to characterize grinds of widely varying size distributions. As used herein, "coarse" grind size indicates that the roast and ground coffee has a particle size distribution such that:

(a) from about 40% to 95% by weight retained on a No. 12 U.S. Standard Sieve, (b) from 0% to about 37% by weight is retained on a No. 16 U.S. Standard Sieve, (c) from 0% to about 12% by weight is retained on a No. 20 U.S. Standard Sieve;

(d) from 0% to about 10% by weight is retained on a No. 30 U.S. Standard Sieve; and (e) from 0% to about 8% by weight pass through a No. 30 U.S. Standard Sieve.

Typical grinding equipment and methods for grinding roasted coffee beans are described, for example, in Sivetz & Foote, id. pp. 239–250.

D. Roll Milling

The fast roasted and ground coffee subsequently is subjected to a roll milling operation which turns the ground coffee into thick particles. The particles are formed by passing the ground beans through two parallel rollers so that the coffee particles are slightly crushed and flattened.

During the roll milling step it is essential that several processing variables be controlled. These include (1) coffee feed temperature, (2) roll surface temperature, (3) roll diameters, (4) static gap, (5) the roast and ground coffee feed moisture content, (6) feed rate, (7) roll peripheral surface speed, (8) roll pressure, (9) the mill feed particle size distribution, and (10) density of mill feed. To produce the final product of this invention, it is necessary that the ground coffee be milled under conditions in which compressive forces are applied to the coffee but little or no flaking or attrition of the particles in comparision to conventional milling processes occurs. The milling conditions which produce the new product are based on a high feed rate to the rolls, a relatively slow roll speed and pressures sufficient to produce a product within the desired density range.

The process of the present invention can be practiced with the aid of any of a variety of roll mills of various roll diameters capable of subjecting roast and ground coffee to mechanical compressing action and adapted to the adjustment of roll pressure, roll speed and roll temperature. Suitable mills are those having two parallel rolls such that coffee particles passed between the rolls are crushed or flattened. Normally, smooth or highly polished rolls will be employed as they permit ready cleaning; other rolls can, however, be employed if the desired effects can be obtained.

1. Coffee Feed Temperature

The temperature of the roll mill roast and ground coffee when fed into the roll mill should be less than 80° F. (27° C.), preferably between 55° F. and 65° F. (13° and 18° C.). It may be necessary to subject the ground coffee beans to an additional cooling step to reduce the temperature to within this desired range for milling.

Maintenance of the coffee feed temperature along with maintenance of the roll surface temperature within the ranges given below insures that aroma losses during the roll milling step are sufficiently reduced such that the resultant milled coffee provides the desired container aroma level.

2. Roll Surface Temperature

Control of the surface temperature of each roll has been found to be important to the provision of milled roast and ground coffee of high extractability. Roll surface temperature, as used herein, is measured in degrees Fahrenheit and refers to the average surface temperature of each roll. The rolls can be operated at differential operating temperatures; however, operation under these conditions is not preferred.

The surface temperature of each of the respective rolls can be controlled in known manner. This is usually accomplished by control of the temperature of a heat exchange fluid passing through the inner core of the rolls.

To produce the cool processed, coarsely ground, and lightly milled roast and ground coffee of the present invention, it is essential that the roll surface temperature be within the range of from 50° F. to 90° F. (10° C. to 32° C.), preferably between about 60° F. to about 80° F. (16° C. to 27° C.). In general, higher roll surface temperatures produce roast and ground coffee particles which typically have undesirably low levels of aroma. Lower roll surface temperatures require elaborate cooling systems and are an inefficient means of cooling coffee.

3. Roll Diameters

The diameter of the roll mills controls the angle of entry of the coffee into the nip which in turn affects particle thickness and bulk density. Rolls smaller than 6 inches (15.4 cm.) in diameter can be employed to mill coffee; however, such small rolls tend to hamper passage of the coffee through the mill by a churning effect which decreases throughput and efficiency. Roll mills with diameters of up to 48 inches (123 cm.) are suitable for use herein. However, best results are obtained from mills having diameters in the range of from 6 to 30 inches (15.4 to 77 cm.). Examples of suitable mills which can be adapted in known manner to operate within the parameters defined hereinbefore include any of the well-known and commercially available roll mills such as those sold under the tradenames of Lehmann, Thropp, Ross, Farrell and Lauhoff.

4. Static Gap

As used herein, the term "mechanical static gap" represents that distance separating the two roll mills along the line of nip while at rest and is typically measured in mils. A special condition of roll spacing is "zero static gap" which is used herein to indicate that the two rolls are in actual contact with each other along the line of nip when the roll mills are at rest. As roast and ground coffee is fed into the roll mills and drawn through the nip, it causes the rolls to deflect an amount which is dependent upon the roll peripheral speed, roll pressure, and coffee feed rate. Accordingly, the milled coffee of the present invention can be made even when the roll mills are set at zero static gap. Because of the deflecting action of the coffee feed as it passes through the roll mill, the static gap setting must be less than the desired particle thickness. In the most preferred method of practice, a zero static gap spacing of the roll mills is employed.

5. Moisture Content of the Roll Mill Feed

As indicated above, in producing consumer-acceptable milled roast coffee, the average particle moisture content should be from about 3% to about 6% by weight. Since the moisture level of the coffee particles is not significantly affected by the milling operation, the moisture level of the milled coffee product can be controlled by controlling the moisture content of the roast and ground coffee feed.

6. Feed Rate

The feed rate into the roll mill is to be distinguished from the throughput rate of the roll mill. The feed rate to the roll mill is that amount of material per hour per inch of nip which is fed into the nip area. The throughput rate is the amount of material per hour per inch of nip that actually passes through the roll mill. When the feed rate exceeds the throughput rate, a condition occurs which is referred to in the art as "choke feeding". When choke feeding occurs, there is a buildup of material which "boils" in the nip region before passing through the nip. Such boiling may cause an undesirable effect on the particle size distribution of the milled coffee product by increasing the percentage of fines and, therefore, is to be avoided.

Conversely, when the feed rate falls below the theoretical throughput rate, the feed rate and throughput rate are the same. This condition is referred to in the art as "starve feeding". Starve feeding offers the particular process advantages as increased equipment life and increased process flexibility and is, therefore, the suitable mode of operation in the method of the present invention.

Generally, to produce the coffee product of the present invention, the ground coffee should be passed through a roll mill at the rate of about 700 lbs./hr./inch of nip to about 900 lbs./hr./inch of nip (12,500 kg./hr./m. of nip to 16,050 kg./hr./m. of nip).

7. Roll Peripheral Surface Speed

Control of the peripheral surface speeds of the rolls has also been found to be important to the provision of the present coffee product. The roll peripheral surface speed is measured in feet per minute of roll surface circumference which passes by the nip. Generally, the roll mill should be operated at a roll speed of from about 300 ft./min. to about 1000 ft./min. (91 m./min. to 305 m./min.), preferably from about 450 ft./min. to about 700 ft./min. (137 m./min. to 213 m./min.).

For a given set of roll mill operating conditions, the throughput rate, the roll pressure, the roll peripheral surface speed and the thickness of the milled coffee produced are closely related. In the production of milled coffee of a specified thickness, the throughput rate is directly related to the roll peripheral surface speed. Thus, an increase in the roll peripheral surface speed allows an increase in the throughput rate in producing particles of specified thickness. When a constant throughput rate is maintained (e.g. by controlling the feed rate), higher roll peripheral surface speeds produce thinner particles and conversely, lower roll peripheral surface speeds produce thicker particles.

While peripheral surface roll speeds have been set forth in connection with operation of a roll mill to provide milled coffee of improved extractability, it will be appreciated that optimal speeds will be determined in part by the other roll mill conditions such as the size of the rolls employed, the static gap setting, etc., as well as the physical and organoleptic properties desired in the final product.

8. Roll Pressure

Roll pressure will also influence the nature of the cool processed roast and ground coffee particles obtained by the process of the present invention. Roll pressure is measured in pounds per inch of nip. Nip is a term used in the art to define the length of surface contact between two rolls when the rolls are at rest. To illustrate, it can be thought of as a line extending the full length of two cylindrical rolls and defining the point or line of contact between two rolls.

To produce the present coffee particles in high yield, roll pressures should be within the range of from 500 lbs./linear inch of nip to 3000 lbs./linear inch of nip (8920 kg./linear meter to 53,500 kg./linear meter) and preferably within the range of from 1000 lbs./linear in. of nip to 2,000 lbs./linear inch of nip (17,830 kg./linear meter to 35,775 kg./linear meter). In general, operable feed rates are directly related to the roll pressure. Thus, higher roll pressure allows a higher feed rate to the roll mill to produce a particle of specific thickness for otherwise equivalent operating conditions of the roll. Roll pressure can also be used to fine tune finished product density, e.g. lower roll pressure results in slightly lower density. In general, roll pressures should be maintained as low as possible to achieve desired product properties.

10. Mill Feed Density

The density of the ground coffee to be milled has an effect on the density of the final coffee product. In general, the density of the product will be proportional to the mill feed density at a given set of operating conditions. The mill feed density is controlled in two ways: by the whole roast density and by the mill feed particle size distribution. The whole roast density can vary from 0.35 gm./cc. to 0.43 gm./cc. Since the density of the coffee increases throughout the manufacturing process, the whole roast density sets the lower limit of the density. Secondly, the coarser the mill feed particle size distribution, the less dense the mill feed will be. The mill feed density can vary from 0.35 gm./cc. to 0.45 gm./cc.

SCREENING

After the roast and ground coffee feed has been milled by being passed through the roll mill, the coffee produced may go through a sizing operation to achieve the proper final particle size distribution.

A wide variety of suitable sizing methods and apparatus are known in the art (see for example, "Perry's Handbook for Chemical Engineers", McGraw-Hill Book Co., pp. 21-46 to 21-52, incorporated herein by reference). For example, the milled coffee can be screen-sized effectively by dropping the coffee particles from a hopper, chute or other feeding device into a mechanically vibrating screen or into a multiple sieve shaker such as those marketed by Newark Wire Cloth Company and the W. S. Tyler Company. Typically, the sizing operation separates the milled coffee of various particle sizes into desired size fractions in less than one minute.

The cool processed, coarsely ground, and lightly milled roast and ground coffee of the present invention can be packaged and utilized in the preparation of a coffee brew or extract in known manner.

TESTING AND EVALUATION

1. Roast Color

In providing a consumer acceptable flaked coffee product it is preferred that the flaked coffee have a color which is defined by a Hunter Color "L" scale value ranging from 18 to 23, with from 19 to 21 being most preferred. Flaked coffee Hunter Colors within these ranges have been found to be desirable because within these ranges the flaked product has a color impression substantially equal to that of roast and ground coffee, which the consumer regards as highly desirable.

The Hunter Color scale values, utilized herein to define a preferred color of a flaked coffee product, are units of color measurement in the Hunter Color system. That system is a well-known means of defining the color of a given material. A complete technical description of the system can be found in an article by R. S. Hunter, "Photoelectric Color Difference Meter", Journal of the Optical Society of America, Vol. 48, pp. 985-95, 1958. Devices specifically designed for the measurement of color on the Hunter scales are described in U.S. Pat. No. 3,003,388 to Hunter et al, issued Oct. 10, 1961. In general, Hunter Color "L" scale values are units of light reflectance measurement, and the higher the value is, the lighter the color is since a lighter color material reflects more light. In particular, in the Hunter Color system the "L" scale contains 100 equal units of division; absolute black is at the bottom of the scale ($L=0$) and absolute white is at the top of the scale ($L=100$). Thus in measuring Hunter Color values of the flaked coffee of this invention, the lower the "L" scale value the darker the flakes. The "L" scale values described herein are also accurate means of defining the degree of roast necessary to produce a coffee which when flaked gives a product within the "L" scale values herein described. Determination of optimum roasting conditions varies with the coffee employed but is within the skill of one knowledgeable in the field and can be determined after a few Hunter Color measurements of degrees of roast and comparision of the roasted and ground color values with the roasted ground and flaked color values.

2. Measuring Aroma Level—Gas Chromatographic Method

The present flaked coffee compositions provide superior levels of coffee aroma in the headspace or voidspace of canisters holding the vacuum packed coffee. Superior coffee aroma levels thus provide an enhancement of the pleasurable "fresh ground" coffee aroma upon the opening of the packed coffee. The superiority of the coffee aroma levels of the present milled coffee compositions can be confirmed and quantified by resort to comparisons of the volatile materials concentration in the voidspace.

A suitable technique for measuring the container coffee aroma of the milled coffee particles produced by the process of the invention is gas chromatography. The flame ionization gas chromatograph analytical measurement herein measures the total content of organic compounds in a gas headspace or voidspace sample from packaged coffee on a scale of relative intensity. The scale is graduated in microvolt-seconds (referred to herein as "counts") which is a measure of the area under the intensity curve, and the result is reported as an integration of the total area under the curve in total microvolt-seconds ("total counts").

A. Principle of Operation

The chromatograph comprises a 36 inch chromosorb WAW (acid washed) 60/80 mesh column of ¼ in. diameter and is housed in an oven section for isothermal temperature control. The column is packed with a uniform sized solid called the solid support but is not coated with a non-volatile liquid (called the substrate) because the gas is not to be separated into individual compounds as is commonly done in this type of analysis. A hydrogen flame detector is used at the outlet port. An electrometer receives the output signal from the flame detector and amplifies it into a working input signal for an integration. The integrator both sends a display signal to a recorder to print out the response curve and electronically integrates the area under the curve.

The gas sample is injected into a heated injection port and is immediately swept into the packed column by a carrier gas flow. The non-separated gas mixture is swept as a compact band through the column and into the detector. The detector then ionizes the sample and generates an electrical signal proportional to the concentration of the materials in the carrier gas. The ionized gases and carrier gas are then vented from the unit.

B. Specific Equipment and Conditions

A Hewlett Packard gas chromatograph (Model 700), electrometer (Model 5771A), integrator (Model 3370A), and recorder (Model 7127D), range 0-5 mv. and temperature controller (Model 220) were used. Nitrogen pressure in the column is approximately 16 psig. Air pressure of 24 psig is used to flush out the detector. An oven temperature of 100° C. is used and maintained to keep the volatiles vaporized. The hydrogen is supplied from a gas cylinder regulated at 30 lbs. psig.

C. Analytical Procedure

Each peak is measured in counts, the counts being first measured by the flame detector and then both integrated and recorded. The number of counts for a particular component is directly proportional to the number of milligrams of that component in the vapor sample.

The recorder was synchronized with the integrator as follows:

1. Calibration

A standard methane gas is used to precisely set the flame ionization response. Prior to analyzing the samples, a 1 cc. sample of gas is obtained from a gas cylinder (0.5% by weight of $CH_4$). The gas sample is at a pressure of 4.0 psig. The gas sample is syringed into the inlet port of gas chromatograph. The attenuation of the recorder is set at 8 while the range is 10. The total counts when the procedure is repeated three times average between 145,000 to 150,000 total counts. If the average is not within the specified range, the air flow rate is adjusted.

2. Sample Analysis

The sample must be vacuum packed for at least 3 days at 75°±5° F. before sampling. The vacuum-sealed canister of coffee is punctured to remove the vacuum, then resealed and allowed to equilibrate at least one hour at 75°±5° F. to allow aroma phase equilibration.

After equilibration, a 1 cc. sample of the aromatic atmosphere of the canister headspace/voidspace is taken again using the same type of syringe as used for the standard methane sample. The gas sample is then injected into the inlet port of the gas chromatograph.

3. Turbidity

Coffee brew clarity, or turbidity, is measured by means of a Hach ratio turbidimeter. A turbidimeter measures the degree of light scattering as a beam of light is passed through the brew solution. The turbidimeter is calibrated by means of a standard with a known degree of turbidity. Then, diluted brew solutions are placed in Kimble optic glass ampules, and measurements are taken via an electronic readout. Measurements are given in Nephelometric Turbidity Units (NTU). A higher NTU number indicates a more turbid, or less clear, brew.

The following examples are offered to further illustrate but not limit the invention disclosed herein.

EXAMPLE 1

One hundred twenty-five pounds of a blend of prime Brazil and Robusta coffee beans are roasted on a Thermolo roaster to an average roast color between 18 and 23 on the Hunter "L" scale. The roast time is 4 minutes. The roasted beans are quenched with 3.1 gallons of water, then are cooled to between 40° F. and 50° F. overnight. The cooled beans then are coarsely ground. The size distribution of the particles is as follows:

| U.S. Screen Mesh | % |
| --- | --- |
| +12 | 82 |
| +16 | 8 |
| +20 | 4 |
| +30 | 2 |
| Pan | 3 |

The ground coffee is transported to the mill. The coffee is milled on a Ross Mill with an 18 inch roll diameter at zero gap with 1360 lbs./linear inch roll pressure, a feed rate of 825 lbs./hr./in., a roll peripheral speed of 600 ft./min., and a roll temperature of 75° F. The milled coffee is collected in a hopper and then passed through a 7 mesh U.S. Standard Screen fitted to a Sweco vibrator. The product then is blended for 30 seconds in a rotary "cement-type" mixer and vacuum packed.

The resulting product has a particle size distribution as follows:

| U.S. Screen Mesh | % |
| --- | --- |
| +12 | 25 |
| +16 | 30 |
| +20 | 19 |
| +30 | 11 |
| Pan | 15 |

The particles have an average thickness of 34 mils and a tamped bulk density of 0.413 g./cc. After vacuum packing the container aroma intensity is measured at 38,900 G.C. counts.

The product (47 g.) is brewed in a Norelco brewer with 1420 mls. of water and gives a brew with a 0.87% brew solids content. The brew is clearer than that made with a conventionally processed roast and ground coffee. The container aroma is found by expert panelists to persist longer than a conventional roast and ground coffee.

When 44.8 g. of the product are brewed in a percolator with 1420 mls. of water, a brew is produced which has a brew solids concentration of 0.67%. A brew made with a conventionally processed regular grind coffee (54.4 grams per 1420 ml. of water) from the same coffee blend has 0.70% brew solids content. Expert panelists are unable to detect flavor differences between the products.

EXAMPLE 2

A blend of prime Brazil and Robusta coffees is roasted for 4.5 to 5 minutes to a moisture level of 3.8%. The roasted beans are cooled overnight to 55° F., then are placed in a grinder feed bin where they are ground to give a mill feed with the following particle size distribution:

| U.S. Screen Mesh | % |
|---|---|
| +12 | 87 |
| +16 | 6 |
| +20 | 3 |
| +30 | 2 |
| Pan | 3 |

The ground beans are milled under the same conditions described in Example 1, then are sieved through a 6 mesh U.S. Standard Screen mounted on a Sweco Vibrator. The resulting product has an average particle thickness of 34 mils and a tamped bulk density of 0.405 g./cc. The particle size distribution is as follows:

| U.S. Screen Mesh | % |
|---|---|
| +12 | 32 |
| +16 | 27 |
| +20 | 16 |
| +30 | 10 |
| Pan | 15 |

When 57.1 g. of the product are brewed in a Norelco automatic drip coffee maker with 1420 ml. of water, the resulting brew has a brew solids content of 0.90%. When the turbidity of this brew is measured in a paired comparison against a control brew made using regular grind coffee, it is found that the turbidity of the sample made by the process of this example is measured at 84 NTU and the turbidity of the control sample is 126 NTU.

The container aroma intensity of the vacuum packed product made by the process of this example is measured at 48,600 G.C. counts.

What is claimed is:

1. Roast and ground coffee particles having improved extractability, characterized by:
   (a) a thickness of about 30 to about 40 mils (0.75 to 1.02 mm.);
   (b) a bulk density of about 0.40 to about 0.46 g./cc.;
   (c) a coarse particle size distribution such that from about 15% to about 48% by weight is retained on a No. 12 U.S. Standard Sieve, from about 20% to about 42% by weight is retained on a No. 16 U.S. Standard Sieve, from about 10% to about 25% by weight is retained on a No. 20 U.S. Standard Sieve, from about 2% to about 15% by weight is retained on a No. 30 U.S. Standard Sieve, and from about 5% to about 20% by weight pass through a No. 30 U.S. Standard Sieve; and
   (d) a container aroma intensity of about 30,000 to about 55,000 G.C. counts.

2. The roast and ground coffee composition of claim 1 wherein the average moisture content of the particles is from about 3% to about 8%.

3. The coffee composition of claim 1 wherein the initial aroma concentration is at least about 40,000 gas chromatograph counts.

4. The coffee composition of claim 1 wherein the coffee is decaffeinated.

5. The coffee composition of claim 4 wherein the initial aroma concentration is at least about 30,000 gas chromatograph counts.

6. The coffee composition of claim 1 wherein the particles retained on a No. 16 U.S. Standard Sieve have a thickness of from about 32 to about 36 mils (0.81 to 0.91 mm.).

7. The coffee composition of claim 1 wherein the average moisture content is about 3.5% to about 6%.

8. A method for making an improved roast and ground coffee product, comprising the steps of:
   (a) roasting coffee beans to a color of from about 18 to about 23 on the Hunter "L" scale;
   (b) cooling the roast beans to a temperature below about 65° F. (18° C.);
   (c) coarsely grinding the cooled beans such that
      from about 40% to about 95% by weight is retained on a No. 12 U.S. Standard Sieve,
      from 0% to about 37% by weight is retained on a No. 16 U.S. Standard Sieve,
      from 0% to about 12% by weight is retained on a No. 20 U.S. Standard Sieve;
      from 0% to about 10% by weight is retained on a No. 30 U.S. Standard Sieve;
      from 0% to about 8% by weight pass through a No. 30 U.S. Standard Sieve;
   (d) milling the ground beans, at a temperature below about 80° F. (27° C.), to provide roast and ground coffee particles in which those particles retained on a No. 16 U.S. Standard Sieve have a particle thickness of about 30 to about 40 mils (0.75 to 1.02 mm.).

9. A process according to claim 8 wherein the coffee beans are roasted for about 1 to about 5 minutes.

10. A process according to claim 8 wherein the roasted beans are cooled to a temperature of about 55° to 65° F. (13° to 18° C.) and are maintained within that range as they enter the grinder.

11. A process according to claim 10 wherein the roasted and ground beans are milled at a temperature of about 60° to about 80° F. (16° to 27° C.).

12. A process according to claim 8 wherein the roast and ground coffee is passed through a roll mill at:
   (a) a feed rate of from about 700 lbs./hr./in. of nip to about 900 lbs./hr./in. of nip (12,500 kg./hr./m. of nip to 16,050 kg./hr./m. of nip);
   (b) a roll pressure of from 500 lbs./in. of nip to about 3000 lbs./in. of nip (8920 kg./m. of nip to 53,500 kg./m. of nip);
   (c) a roll temperature of from about 50° to about 90° F. (10° C. to 32° C.);
   (d) a static gap setting of zero;
   (e) a roll peripheral speed of from 300 ft./min. to 1000 ft./min. (91 m./min. to 305 m./min.); and
   (f) a roll diameter of from about 6 inches to about 48 inches, to produce coffee having a particle thickness of about 30 to about 40 mils (0.75 to 1.02 mm.).

* * * * *